No. 670,885. Patented Mar. 26, 1901.
A. LINDGREN.
CULTIVATOR.
(Application filed Nov. 26, 1900.)
(No Model.) 2 Sheets—Sheet 1.

Witnesses

Inventor
August Lindgren
By O. T. Dodge
Attorney

THE NORRIS PETERS CO., PHOTO-LITHO., WASHINGTON, D. C.

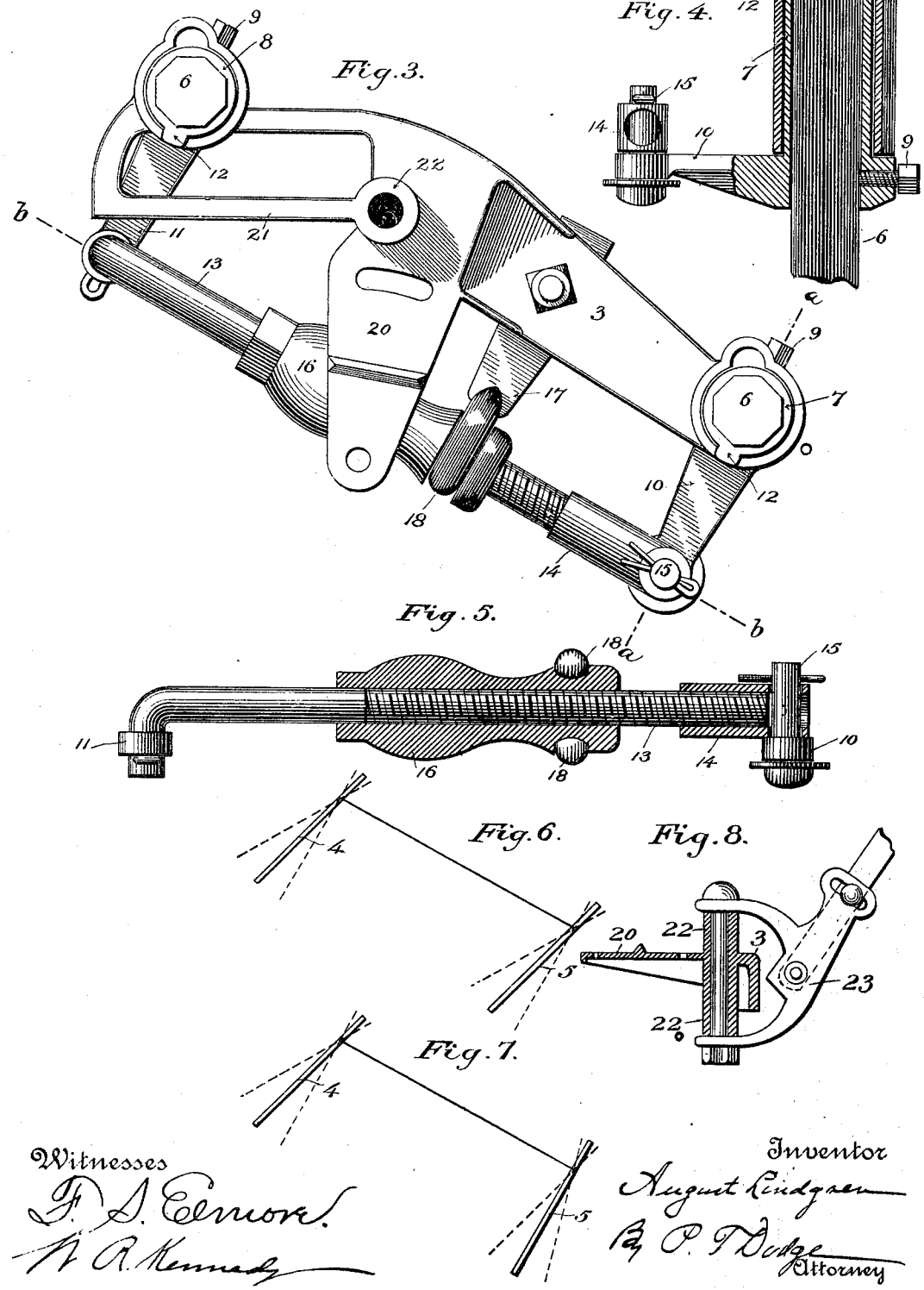

UNITED STATES PATENT OFFICE.

AUGUST LINDGREN, OF MOLINE, ILLINOIS, ASSIGNOR TO THE MOLINE PLOW COMPANY, OF ILLINOIS.

CULTIVATOR.

SPECIFICATION forming part of Letters Patent No. 670,885, dated March 26, 1901.

Application filed November 26, 1900. Serial No. 37,794. (No model.)

*To all whom it may concern:*

Be it known that I, AUGUST LINDGREN, of Moline, county of Rock Island, and State of Illinois, have invented a new and useful Improvement in Cultivators, of which the following is a specification.

This invention relates to cultivators, and has reference more particularly to what are known in the art as "surface" cultivators, in which the cultivator-blades act on the surface of the soil at the sides of the rows of plants.

The aim of the invention is to provide for various adjustments of the blades to change their angles with respect to the line of travel and also with relation to each other; and the invention consists in an improved connection between the blades by which their adjustments may be quickly effected to a nicety and the parts firmly held in their adjusted positions.

The invention consists also in the details of construction and combination of parts hereinafter described and claimed.

Figure 1:
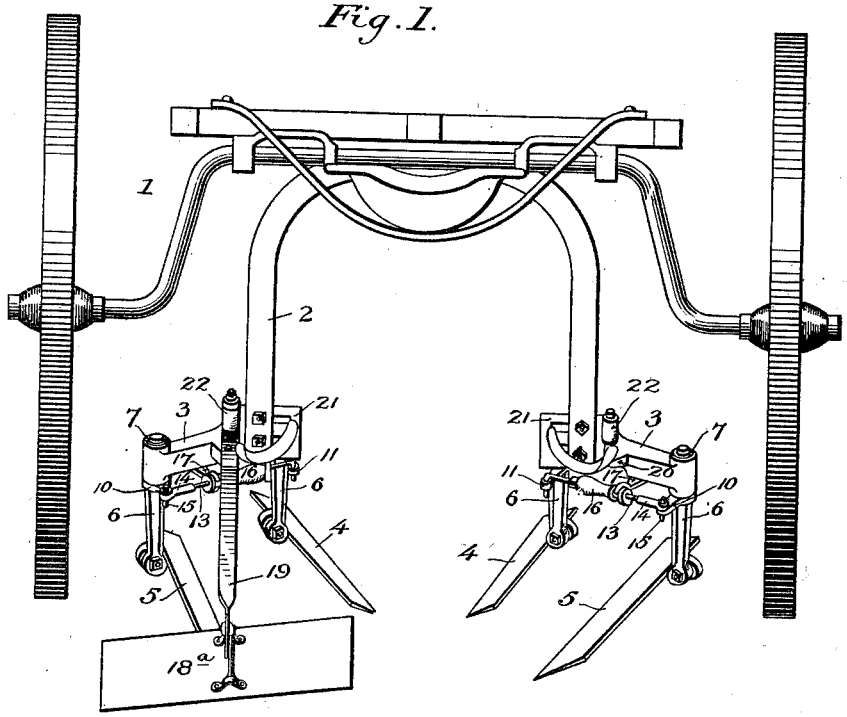
Figure 2:
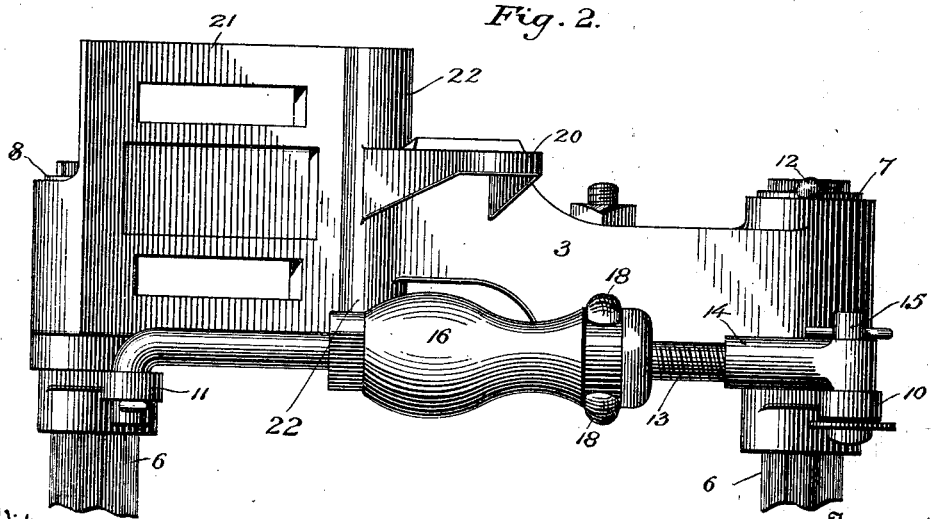

In the accompanying drawings, Figure 1 is a rear perspective view of a cultivator having my invention embodied therein. Fig. 2 is a rear elevation, on an enlarged scale, of one of the castings or heads in which the blades are mounted. Fig. 3 is a top plan view of the same. Fig. 4 is a vertical sectional elevation on the line *a a* of Fig. 3. Fig. 5 is a transverse vertical sectional elevation on the line *b b* of Fig. 3. Fig. 6 is a diagrammatic view showing the different common adjustments of the blades. Fig. 7 is a view showing how the blades may be adjusted one with respect to the other and then subjected to their common adjustment. Fig. 8 is a sectional elevation through one of the castings or heads, showing how the draft-clevis is connected therewith.

Referring to the drawings, 1 represents a wheeled frame provided with a vertical arched member 2, having bolted to its lower ends transverse horizontal castings or heads 3, carrying each two cultivator-blades 4 and 5, adapted to act in pairs on the opposite sides of the row of plants as the machine advances. As the heads, blades, and adjusting devices are the same on both sides of the machine, a description of one set will suffice. The blades are of elongated rectangular form and when in action extend obliquely with relation to the line of advance, one slightly in advance of the other, their action being to scrape and loosen the soil and work the same gradually toward the center. They are mounted on the lower ends of vertical shanks 6, angular in cross-section and fitted in vertical cylindrical sleeves 7 and 8, formed with vertical through-sockets to receive the shanks, which sleeves are mounted loosely in vertical circular openings formed in the ends of the head, the shanks being held firmly but adjustably within the sleeves by set-screws 9, which are tapped through the lower ends of the sleeves and bear on the shanks. On their lower ends, at the under side of the head, the sleeves are provided, respectively, with horizontal crank-arms 10 and 11, by which the sleeves, with the shanks, may be rotated within the head to adjust the blades, while at their upper ends the sleeves are each provided with a lateral lug or stop 12, bearing on the head adjacent to the openings and serving to hold the sleeves against endwise movement.

By the construction described it will be seen that the shanks carrying the blades are rotatable in the head around a vertical axis passing through them, which movement will vary the inclination of the blades with respect to the line of advance. This adjustment of the blades is effected by the two crank-arms, which are so connected that they may be moved in unison to the right or left and held fixedly in the position to which they are adjusted. The connection between the crank-arms consists of a horizontal threaded rod 13, having one end bent laterally and mounted loosely in the end of the crank-arm 11 and its opposite end screwed into a horizontal collar 14, having a vertical opening to receive a pivot-pin 15, extending upward through the end of crank-arm 10, by which means the threaded rod is jointed to the crank-arm. The threaded rod is encircled by an interiorly-threaded hand-nut 16, held against endwise movement by an arm 17, fixed to the under side of the head and formed with fingers 18, engaging loosely in an annular groove in the nut. As a result of this construction the rotation of the hand-nut will move the threaded rod endwise with relation to the head and the crank-arms will be correspondingly moved in unison, and in the same direction turning the sleeves and the shanks held thereby and changing the inclination of the blades, as indicated by the diagrammatic view, Fig. 6.

By reason of the peculiar construction between the blades a very fine adjustment may be quickly effected without the necessity of loosening any clamping-bolts, and after once adjusted to the desired inclination the blades will be held fixedly and firmly in position. It is further to be noted that the parallelism of the blades is preserved, notwithstanding the angle in which they may be adjusted.

In certain kind of work it may be desirable to set one blade at a different angle from the other and to preserve this difference under their common adjustments. This is effected by removing the pivot-pin 15 and screwing the sleeve on the rod to change the position of blade 10. When the desired relative position of this blade to the other has been thus attained, the parts are again connected by the pivot-pin, and any common adjustment of the blades by the hand-nut will, as before, move them in unison without changing the relation of one to the other, as shown in diagrammatic view, Fig. 7.

It will be observed that the blades on one side of the machine are adjustable wholly independent of those on the other side, there being no connection between them. Under these conditions the blades on one side may be given a greater or less degree of obliquity than the opposite blades, so as to act on a greater or less area, according to the conditions encountered in practice.

The castings or heads are peculiarly formed to be secured to the arched member to receive the draft appliances and to give support to the cultivator-blades and also a leveler-blade 18$^a$. This blade acts in rear of the cultivator-blades and is fixed on the ends of an arm 19, curved upward and forward and seated and secured on a horizontal bracket 20, extending rearwardly from the head at its upper side. To one side of this bracket the head is formed with a vertical flat face 21, which is seated against the arched member and secured thereto, as described, the plane of this surface being oblique to a line joining the two openings of the end of the head, so that the latter will occupy such a position that one of the cultivator-blades will be slightly in advance of the other. About midway between its ends the head is further provided above and below with vertical bosses 22, formed with a through-opening, by means of which the draft is applied to the head by a draft-clevis 23, Fig. 8, to hold the blades to their work.

It is further obvious that various changes in the details, such as would suggest themselves to persons skilled in the art, may be made without departing from the limits of the invention.

Having thus described my invention, what I claim is—

1. In a cultivator the combination with the head, of a plurality of blades, shanks connected with the blades and mounted loosely in the head to turn on vertical axes, arms connected with the shanks, a rod connecting the arms and movable endwise, and a rotary operating member sustained by the head and fixed against endwise movement and operatively connected with the rod.

2. In a cultivator the combination with the head, of a plurality of blades, shanks carrying blades and mounted loosely in the head, arms connected with the shanks, a rod jointed at one end to one of the arms and a sleeve jointed to the other arm and adjustably connected with the end of the rod; whereby the blades may be adjusted one with relation to the other and are adapted to be moved in unison.

3. In a cultivator the combination with the head, of a plurality of blades, vertical shanks carrying blades and mounted loosely in the head to turn on vertical axes, a horizontal internally-threaded sleeve, a removable vertical pivot-pin connecting the sleeve with one of the arms, a rod screwed into said sleeve at one end and jointed at its opposite end to the other arm, and means for adjusting the rod endwise.

4. In a cultivator the combination with the head of a plurality of blades, shanks carrying the blades and mounted loosely in the head, arms connected with the shanks, a threaded rod connecting the arms, and a nut mounted on the rod and fixed against endwise movement.

5. In a cultivator the combination with the frame of a head sustained thereby and provided with vertical openings, sleeves mounted loosely in the openings, blades having shanks fixed within the sleeves, operative connections between the sleeves and means for adjusting the sleeves.

6. In a cultivator the combination with the frame of a head provided with vertical openings, sleeves mounted loosely therein and provided with arms, a jointed connection between the arms, cultivator-blades provided with shanks mounted in the sleeves and means for adjusting the sleeves.

7. In a cultivator a casting or head provided in opposite ends with vertical openings to receive the blades, and formed with a vertical flat face for attachment to the frame, said face being in a plane oblique with relation to a line joining said openings.

8. In a cultivator a casting or head provided with openings for the attachment of the blades, with a vertical flat face for attachment to the frame, and a horizontal rearwardly-extending flat face for the attachment of the leveler.

9. In a cultivator a casting or head formed with a flat face for attachment to the frame, vertical bosses for the attachment of the clevis, and further formed to sustain the cultivator-blades.

In testimony whereof I hereunto set my hand, this 17th day of November, 1900, in the presence of two attesting witnesses.

AUGUST LINDGREN.

Witnesses:
C. H. LIPPINCOTT,
L. C. BLANDING.